United States Patent
Miyazaki et al.

(10) Patent No.: US 12,487,668 B2
(45) Date of Patent: Dec. 2, 2025

(54) ELECTRONIC DEVICE, METHOD FOR CONTROLLING ELECTRONIC DEVICE, AND PROGRAM

(71) Applicant: KYOCERA Corporation, Kyoto (JP)

(72) Inventors: Jungo Miyazaki, Kawasaki (JP); Yusuke Nishii, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 230 days.

(21) Appl. No.: 18/555,978

(22) PCT Filed: Apr. 7, 2022

(86) PCT No.: PCT/JP2022/017279
§ 371 (c)(1),
(2) Date: Oct. 18, 2023

(87) PCT Pub. No.: WO2022/230629
PCT Pub. Date: Nov. 3, 2022

(65) Prior Publication Data
US 2024/0220011 A1  Jul. 4, 2024

(30) Foreign Application Priority Data
Apr. 27, 2021 (JP) .................. 2021-075343

(51) Int. Cl.
*G06F 3/01* (2006.01)
*G06T 7/77* (2017.01)
(Continued)

(52) U.S. Cl.
CPC ............... *G06F 3/013* (2013.01); *G06T 7/77* (2017.01); *G06V 10/764* (2022.01);
(Continued)

(58) Field of Classification Search
CPC ............ G06V 20/597; G06F 2203/011; G06T 2207/30268
See application file for complete search history.

(56) References Cited

U.S. PATENT DOCUMENTS

| 8,085,140 B2 | 12/2011 | Mochizuki et al. |
| 10,628,688 B1 | 4/2020 | Kim et al. |

(Continued)

FOREIGN PATENT DOCUMENTS

| JP | 2019-139277 A | 8/2019 |
| JP | 2020-123343 A | 8/2020 |
| WO | 2008/029802 A1 | 3/2008 |

OTHER PUBLICATIONS

Tatsunori Matsui et al.; "Study on Estimation of Learner's Mental States from Physiological Indexes Considering Time Dilation and Persistent Model of Mental States"; The 32nd Annual Conference of the Japanese Society for Artificial Intelligence, 2018; pp. 1-13.

(Continued)

*Primary Examiner* — Thomas S McCormack
(74) *Attorney, Agent, or Firm* — Studebaker Brackett PLLC

(57) ABSTRACT

An electronic device includes an encoder and a decoder. The encoder is configured to estimate an unknown value on the basis of first biological information including a line of sight of a subject extracted from an image of the subject, subject's attribute information representing an attribute of the subject, and subject's internal state information representing an internal state of the subject. The decoder is configured to estimate second biological information including the line of sight of the subject on the basis of the unknown value, the subject's attribute information, and the subject's internal state information. The electronic device adjusts parameters of the encoder and the decoder on the basis of reproduc- (Continued)

ibility of the first biological information from the second biological information.

16 Claims, 7 Drawing Sheets

(51) Int. Cl.
  *G06V 10/764* (2022.01)
  *G06V 20/59* (2022.01)
(52) U.S. Cl.
  CPC ...... *G06V 20/597* (2022.01); *G06F 2203/011* (2013.01); *G06T 2207/20076* (2013.01); *G06T 2207/30201* (2013.01); *G06T 2207/30268* (2013.01)

(56) References Cited

U.S. PATENT DOCUMENTS

| | | |
|---|---|---|
| 2019/0370662 A1 | 12/2019 | Song |
| 2021/0357701 A1 | 11/2021 | Hyuga et al. |

OTHER PUBLICATIONS

Taiki Inoue et al.; "Diagnostic Classification of Chest X-Rays Pictures with Deep Learning Using Eye Gaze Data"; The 33rd Annual Conference of the Japanese Society for Artificial Intelligence, 2019; pp. 1-10.

ELECTRONIC DEVICE, METHOD FOR CONTROLLING ELECTRONIC DEVICE, AND PROGRAM

CROSS-REFERENCE TO RELATED APPLICATIONS

This application claims priority to Japanese Patent Application No. 2021-75343 filed on Apr. 27, 2021, the entire disclosure of which is incorporated herein by reference.

TECHNICAL FIELD

The present invention relates to an electronic device, a method for controlling an electronic device, and a program.

BACKGROUND OF INVENTION

Safe driving of a movable body requires driver's attention. Studies have been conducted which involve observing the level of driver's attention and providing the diver with a warning or driving assistance if the driver's attention drops. In a proposed technique for observing the level of attention, a cumulative visibility is calculated and compared with a reference value. The cumulative visibility is a cumulative value of the degrees to which the line of sight overlaps a nearby object, such as an oncoming vehicle (see Patent Literature 1).

Also, in recent years, studies have been conducted which attempt to estimate an internal state, such as a concentration level or emotion, of a subject. For example, an approach to estimating the mental states of learners has been reported. In this approach, teacher's utterances, learner's biological information, and a learner's video image are recorded during a lecture. Then after the lecture, the learners report introspective observation of own emotions in each scene (see Non Patent Literature 1). Also, for example, an approach has been reported in which diagnostic data and eye-gaze data of readers who read X-ray pictures are collected to interpret chest X-ray pictures using deep learning (see Non Patent Literature 2).

CITATION LIST

Patent Literature

Patent Literature 1: International Publication No. 2008/029802

Non Patent Literature

Non Patent Literature 1: Tatsunori Matsui, Tatsuro Uno, Yoshimasa Tawatsuji, "Study on Estimation of Learner's Mental States from Physiological Indexes Considering Time Dilation and Persistent Model of Mental States", The 32nd Annual Conference of the Japanese Society for Artificial Intelligence, 2018, The Japanese Society for Artificial Intelligence Non Patent Literature 2: Taiki Inoue, Nisei Kimura, Kotaro Nakayama, Kenya Sakka, Rahman Abdul, Ai Nakajima, Patrick Radkohl, Satoshi Iwai, Yoshimasa Kawazoe, Kazuhiko Ohe, "Diagnostic Classification of Chest X-Rays Pictures with Deep Learning Using Eye Gaze Data", The 33rd Annual Conference of the Japanese Society for Artificial Intelligence, 2019, The Japanese Society for Artificial Intelligence

SUMMARY

In an embodiment, an electronic device includes an encoder and a decoder. The encoder is configured to estimate an unknown value on the basis of first biological information including a line of sight of a subject extracted from an image of the subject, subject's attribute information representing an attribute of the subject, and subject's internal state information representing an internal state of the subject. The decoder is configured to estimate second biological information including the line of sight of the subject on the basis of the unknown value, the subject's attribute information, and the subject's internal state information. The electronic device adjusts parameters of the encoder and the decoder on the basis of reproducibility of the first biological information from the second biological information.

In another embodiment, an electronic device includes an encoder, a decoder, and an estimator. The encoder is configured to estimate an unknown value on the basis of first biological information including a line of sight of a subject extracted from an image of the subject, subject's attribute information representing an attribute of the subject, and a value assumed to be subject's internal state information representing an internal state of the subject. The decoder is configured to estimate second biological information including the line of sight of the subject on the basis of the unknown value, the subject's attribute information, and the value assumed to be the subject's internal state information. The estimator is configured to assume a plurality of values to be the subject's internal state information, and estimate a value of the plurality of values, corresponding to the highest reproducibility of the first biological information from the second biological information, to be the subject's internal state information.

In another embodiment, a method for controlling an electronic device includes estimating an unknown value, estimating second biological information, and adjusting. The estimating an unknown value estimates an unknown value on the basis of first biological information including a line of sight of a subject extracted from an image of the subject, subject's attribute information representing an attribute of the subject, and subject's internal state information representing an internal state of the subject. The estimating second biological information estimates second biological information including the line of sight of the subject on the basis of the unknown value, the subject's attribute information, and the subject's internal state information. The adjusting adjusts parameters in the estimating an unknown value and the estimating second biological information on the basis of reproducibility of the first biological information from the second biological information.

In another embodiment, a method for controlling an electronic device includes estimating an unknown value, estimating second biological information, and estimating a value. The estimating an unknown value estimates an unknown value on the basis of first biological information including a line of sight of a subject extracted from an image of the subject, subject's attribute information representing an attribute of the subject, and a value assumed to be subject's internal state information representing an internal state of the subject. The estimating second biological information estimates second biological information including the line of sight of the subject on the basis of the unknown value, the subject's attribute information, and the value assumed to be the subject's internal state information. The estimating a value assumes a plurality of values to be the subject's internal state information, and estimates a value of the plurality of values, corresponding to the highest reproducibility of the first biological information from the second biological information, to be the subject's internal state information.

In another embodiment, a program causes an electronic device to execute estimating an unknown value, estimating second biological information, and adjusting. The estimating an unknown value estimates an unknown value on the basis of first biological information including a line of sight of a subject extracted from an image of the subject, subject's attribute information representing an attribute of the subject, and subject's internal state information representing an internal state of the subject. The estimating second biological information estimates second biological information including the line of sight of the subject on the basis of the unknown value, the subject's attribute information, and the subject's internal state information. The adjusting adjusts parameters in the estimating an unknown value and the estimating second biological information on the basis of reproducibility of the first biological information from the second biological information.

In another embodiment, a program causes an electronic device to execute estimating an unknown value, estimating second biological information, and estimating a value. The estimating an unknown value estimates an unknown value on the basis of first biological information including a line of sight of a subject extracted from an image of the subject, subject's attribute information representing an attribute of the subject, and a value assumed to be subject's internal state information representing an internal state of the subject. The estimating second biological information estimates second biological information including the line of sight of the subject on the basis of the unknown value, the subject's attribute information, and the value assumed to be the subject's internal state information. The estimating a value assumes a plurality of values to be the subject's internal state information, and estimates a value of the plurality of values, corresponding to the highest reproducibility of the first biological information from the second biological information, to be the subject's internal state information.

DESCRIPTION OF EMBODIMENTS

Figure 1:
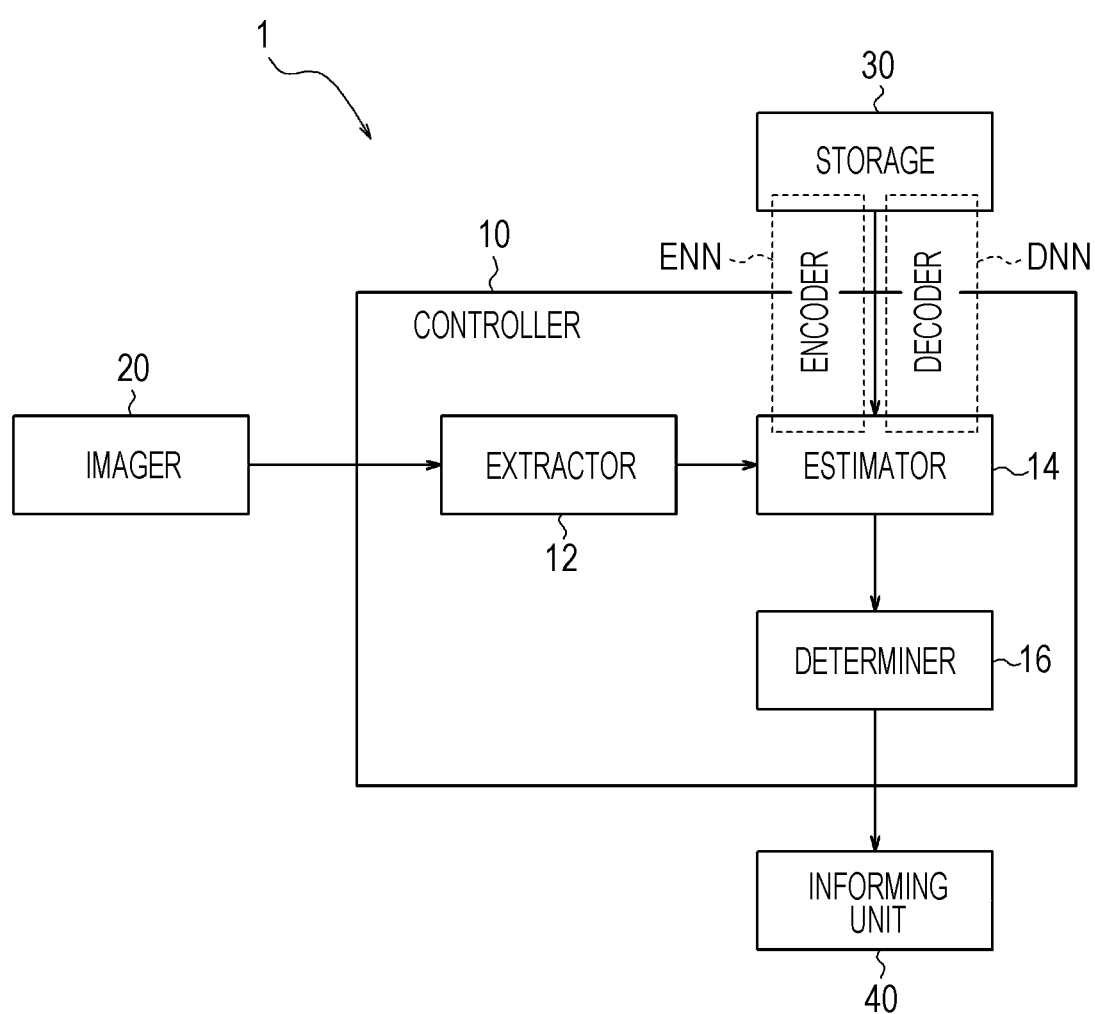
FIG. 1 is a block diagram illustrating a schematic configuration of an electronic device according to a first embodiment.

In the technique disclosed in Non Patent Literature 1, it may be difficult to reasonably model a causal relation between the biological information and the internal state (e.g., emotion) of the subject using a simple discriminative model. That is, in a reasonable flow of information processing, a mental state, such as emotion, causes a biological response. In learning a simple discriminative model, however, a mental state is inferred from biological information. The model structure thus differs from the truth, and model learning is unlikely to be carried out very well. Also, there are occasions where the behavior of the model that estimates the internal state of the subject on the basis of biological information of the subject, is to be explained to the user. From this perspective, it is desirable to further verify the reasonableness of the causal relation in the model that estimates the internal state of the subject on the basis of biological information of the subject. In the technique disclosed in Non Patent Literature 2, as in Non Patent Literature 1, it may be difficult to reasonably model a causal relation between biological information (e.g. eye-gaze data) of the subject and the internal state (e.g., determination of disease) of the subject using a simple discriminative model. Also, in the technique disclosed in Non Patent Literature 2, it is desirable to further verify the reasonableness of the causal relation in the model that estimates the internal state of the subject on the basis of biological information of the subject. As described above, to accurately estimate an internal state, such as a concentration level or emotion, of the subject from biological information of the subject, it is desirable to reasonably model a causal relation in data generation. In the technique disclosed in Patent Literature 1, hourly visibility is calculated using a table to determine cumulative visibility. However, an appropriate table varies depending on the driving situation in actual environment. It has been difficult to accurately observe the level of driver's attention in various driving situations.

The present disclosure provides an electronic device, a method for controlling an electronic device, and a program that reasonably estimate an internal state, such as a concentration level, of a subject on the basis of a data generation process. An embodiment can provide an electronic device, a method for controlling an electronic device, and a program that reasonably estimate an internal state, such as a concentration level, of a subject. Embodiments of the electronic device to which the present disclosure is applied will now be described with reference to the drawings. The following description may also serve as a description of the method for controlling an electronic device and the program to which the present disclosure is applied.

In the present disclosure, "electronic device" may be a device driven by electricity. In an embodiment, an electronic device estimates an internal state, such as a concentration level, of a subject. "Subject" may be a person (typically a human being) whose internal state is estimated by the electronic device according to the embodiment. In the present disclosure, "user" may be a person (typically a human being) who uses the electronic device according to the embodiment. The "user" and "subject" may be either the same person or different persons. The "user" and "subject" may be either human beings or animals other than human beings.

In the embodiment according to the present disclosure, the electronic device is installed, for example, in a movable body. Movable bodies may include, for example, vehicles, ships, and aircrafts. Vehicles may include, for example, automobiles, industrial vehicles, railroad vehicles, living vehicles, and fixed-wing aircrafts traveling on runways. Automobiles may include, for example, passenger cars, trucks, buses, motorcycles, and trolley buses. Industrial vehicles may include, for example, industrial vehicles for agriculture or construction. Industrial vehicles may include, for example, forklifts and golf carts. Industrial vehicles for agriculture may include, for example, tractors, cultivators, transplanters, binders, combines, and lawnmowers. Industrial vehicles for construction may include, for example, bulldozers, scrapers, excavators, crane trucks, dump trucks, and road rollers. Vehicles may include human-powered vehicles. The classification of vehicles is not limited to the examples described above. For example, automobiles may include industrial vehicles that can travel on the road. The same vehicle may be included in multiple categories. Vessels may include, for example, personal watercrafts (PWCs), boats, and tankers. Aircrafts may include, for example, fixed-wing aircrafts and rotorcrafts. In the present disclosure, "user" and "subject" may be persons who drive a movable body, such as a vehicle, or may be passengers who are non-drivers travelling in a movable body, such as a vehicle.

In an embodiment, an electronic device 1 may be any of various types of devices. In the embodiment, for example, the electronic device may be any device, such as a dedicated terminal, a general-purpose smartphone, a tablet, a phablet, a notebook-size personal computer (notebook PC), a computer, or a server. In the embodiment, for example, the electronic device may have the function of communicating with other electronic devices, such as mobile phones or smartphones. The "other electronic devices", described above, may be electronic devices, such as mobile phones or smartphones, or may be any devices, such as base stations, servers, dedicated terminals, or computers. In the present disclosure, "other electronic devices" may also be devices or apparatuses driven by electricity. In the embodiment, the electronic device may communicate with other electronic devices via wired and/or wireless communication.

In the embodiment, the electronic device 1 is described as being installed in a movable body, such as a passenger car. In the embodiment, the electronic device 1 can estimate, in this case, a predetermined internal state (e.g., predetermined mental state) of a person (driver or non-driver) travelling in the movable body, such as a passenger car. The following describes an example in which, in the embodiment, the electronic device 1 estimates the concentration level of the driver during driving, as the internal state of the driver who drives the movable body, such as a passenger car. In this case, in the embodiment, the electronic device 1 can estimate the concentration level of the driver during driving on the basis of, for example, an image of the driver captured during driving.

FIG. 1 is a block diagram illustrating a schematic functional configuration of an electronic device according to an embodiment.

As illustrated in FIG. 1, in the embodiment, the electronic device 1 includes a controller 10, an imager 20, a storage 30, and an informing unit 40. As illustrated in FIG. 1, the controller 10 may include an extractor 12, an estimator 14, and a determiner 16. In the embodiment, the electronic device 1 may include all the functional units illustrated in FIG. 1, or at least some of the functional units illustrated in FIG. 1 may be optional. For example, in the embodiment, the electronic device 1 may include only the controller 10 illustrated in FIG. 1. In the embodiment, in this case, the electronic device 1 may be connected to the imager 20, the storage 30, and the informing unit 40 prepared as external devices. Functions of an encoder ENN and a decoder DNN are implemented by at least one selected from the group consisting of the controller 10, the estimator 14, and the storage 30. Input information and data may be transmitted, for example, to the extractor 12, the encoder ENN, the decoder DNN, and the determiner 16 in this order. The encoder ENN may output a latent variable Z described below. In this case, the decoder DNN may receive the output latent variable Z.

The controller 10 controls and/or manages an overall operation of the electronic device 1, as well as the operation of each functional unit of the electronic device 1. To provide control and processing capabilities for performing various functions, the controller 10 may include at least one processor, such as a central processing unit (CPU) or a digital signal processor (DSP). The controller 10 may be implemented by a single processor or by some processors. The controller 10 may be implemented by discrete processors. The processor may be implemented as a single integrated circuit. The integrated circuit is also referred to as an IC. The processor may be implemented as a plurality of integrated circuits and discrete circuits connected to be capable of communicating with each other. The processor may be implemented on the basis of various other known techniques.

The controller 10 may include at least one processor and memory. The processor may include a general-purpose processor configured to read a specific program and execute a specific function, and a dedicated processor dedicated to specific processing. The dedicated processor may include an application specific integrated circuit (ASIC). The processor may include a programmable logic device (PLD). The PLD may include a field-programmable gate array (FPGA). The controller 10 may be either a system-on-a-chip (SoC) or a system in a package (SiP) where one or more processors work together. The controller 10 controls the operation of each component of the electronic device 1.

The controller 10 may include, for example, at least one of software or hardware resource. In the electronic device 1 according to the embodiment, the controller 10 may be constituted by concrete means in which software and hardware resources work in coordination. At least one selected from the group consisting of the extractor 12, the estimator 14, and the determiner 16 included in the controller 10 may include at least one of software or hardware resource. In the electronic device 1 according to the embodiment, at least one selected from the group consisting of the extractor 12, the estimator 14, and the determiner 16 may be constituted by concrete means in which software and hardware resources work in coordination.

The extractor 12 extracts a line of sight of a subject (subject's line of sight) from an image of the subject (subject's image) captured by the imager 20. The estimator 14 estimates an internal state of the subject (subject's internal state), such as a concentration level of the subject (subject's concentration level). The determiner 16 determines whether the subject's internal state estimated by the estimator 14 satisfies a predetermined condition. If the subject's internal state satisfies the predetermined condition (e.g., if the subject's concentration level drops to a value equal to or less than a predetermined value), the determiner 16 outputs a predetermined alarm signal to the informing unit 40. In the present disclosure, line-of-sight data extracted as data of the subject's line of sight may be treated as coordinate values (x, y) of a point of gaze. In the present disclosure, the line-of-sight data is not limited to coordinates of a point of gaze of the subject. For example, a pupil diameter and/or eye rotation information may be used as a line-of-sight feature.

The operation of the controller 10, and the operation of the extractor 12, the estimator 14, and the determiner 16 included in the controller 10 will be described further later below.

The imager 20 may include an image sensor, such as a digital camera, that electronically captures an image. The imager 20 may include an imaging element, such as a charge coupled device image sensor (CCD) or a complementary metal oxide semiconductor (CMOS) sensor, that performs photoelectric conversion. For example, the imager 20 may feed a signal based on the captured image to the controller 10. For this, as illustrated in FIG. 1, the imager 20 may be connected to the controller 10 by wired and/or wireless connection. The imager 20 is not limited to an imaging device, such as a digital camera, and may be any imaging device capable of capturing a subject's image. For example, by adopting a near-infrared camera, the imager 20 can capture differences in light reflecting features and/or differences in light absorbing features, as an image.

The imager 20 captures a subject's image. Hereinafter, a driver who drives a movable body, such as a passenger car, will be described as an example of the subject. That is, in the embodiment, the imager 20 captures an image of a driver driving a movable body, such as a passenger car. In the embodiment, for example, the imager 20 may capture a still image of the subject every predetermined period (e.g., 30 frames per second). In the embodiment, for example, the imager 20 may capture a sequence of moving images of the subject. The imager 20 may capture a subject's image in various data forms, such as RGB data and/or infrared data.

To capture an image of the driver, the imager 20 may be installed toward the driver, in the forward part of the interior of the movable body, such as a passenger car. The subject's image captured by the imager 20 is fed to the controller 10. As described below, in the controller 10, the extractor 12 extracts biological information including the subject's line of sight from the subject's image. For this, the imager 20 may be installed in an area suitable for capturing an image including the line of sight of the driver.

The storage 30 may serve as a memory that stores various types of information. The storage 30 may store, for example, a program executed by the controller 10 and a result of processing performed by the controller 10. The storage 30 may serve as a working memory for the controller 10. Thus, as illustrated in FIG. 1, the storage 30 may be connected by wired and/or wireless connection to the controller 10. The storage 30 may include, for example, at least one of a random access memory (RAM) or a read only memory (ROM). The storage 30 may be constituted, for example, by a semiconductor memory, but is not limited to this and may be any storage device. For example, the storage 30 may be a storage medium, such as a memory card, inserted into the electronic device 1 according to the embodiment. The storage 30 may be an internal memory of the CPU used as the controller 10, or may be connected as a separate component to the controller 10.

The storage 30 may store, for example, machine learning data. Here, the machine learning data may be data generated by machine learning. The machine learning data may include parameters generated by machine learning. Machine learning may be based on artificial intelligence (AI) technology which enables specific tasks to be executed through training. More specifically, machine learning may be a technology that enables an information processing device, such as a computer, to learn a large amount of data and automatically construct algorithms or models for performing tasks, such as classification and/or prediction. In the present specification, AI may include machine learning. In the present specification, machine learning may include supervised learning which involves learning features or rules of input data on the basis of correct data. Machine learning may include unsupervised learning which involves learning features or rules of input data in the absence of correct data. Machine learning may include reinforcement learning which involves learning features or rules of input data through the process of being rewarded or punished. In the present specification, machine learning may be a combination of any of supervised learning, unsupervised learning, and reinforcement learning.

In the present embodiment, the concept of machine learning data may include an algorithm that outputs a result of predetermined inference (estimation) using an algorithm learned from input data. Other appropriate examples of the algorithm that can be used in the present embodiment include linear regression that predicts a relation between a dependent variable and an independent variable, a neural network (NN) obtained by mathematically modeling a human cerebral neuron, a least-squares method that squares errors for calculation, decision tree that uses a tree structure for problem solving, and regularization that modifies date in a predetermined method. The present embodiment may use a deep neural network which is a type of neural network. A deep neural network is a type of neural network, and generally refers to a network having a deep structure with one or more intermediate layers. Deep learning is frequently used as an algorithm that constitutes AI.

In the embodiment, information stored in the storage 30 may be, for example, information stored in advance before shipment from the factory, or may be information appropriately acquired by the controller 10. In the embodiment, the storage 30 may store information received from a communication unit (communication interface) connected to the controller 10 or the electronic device 1. In this case, for example, the communication unit may communicate with an external electronic device or a base station via at least one of wireless or wired communication to receive various types of information. In the embodiment, the storage 30 may store information received by an input unit (input interface) connected to the controller 10 or the electronic device 1. In this case, the user of the electronic device 1 or other persons may enter various types of information by operating the input unit.

The informing unit 40 may output a predetermined alarm for alerting the user of the electronic device 1, on the basis of a predetermined signal (e.g., alarm signal) output from the controller 10. For this, as illustrated in FIG. 1, the informing unit 40 may be connected to the controller 10 by wired and/or wireless connection. The informing unit 40 may be any functional unit that stimulates at least one selected from the group consisting of the senses of hearing, sight, and touch of the user by using sound, voice, light, text, video, vibration, or the like as a predetermined alarm. Specifically, the informing unit 40 may include at least one selected from the group consisting of a sound output unit such as a beeper or a speaker, a light emitting unit such as an LED, a display unit such as an LCD, and a touch presenting unit such as a vibrator. The informing unit 40 may thus output a predetermined alarm on the basis of a predetermined signal output from the controller 10. In the embodiment, the informing unit 40 may output a predetermined alarm as information that acts on at least one selected from the group consisting of the senses of hearing, sight, and touch of a living being, such as a human being.

In the embodiment, for example, if the concentration level (internal state) of the subject is estimated to drop to a value equal to or less than a predetermined threshold, the informing unit 40 may output an alarm indicating that the concentration level of the subject has dropped. In the embodiment, for example, if the concentration level of the driver is estimated to drop to a value equal to or less than a predetermined threshold, the informing unit 40 configured to output visual information may inform the driver and/or other users, through the use of light emission or predetermined display, that the concentration level of the driver has dropped. In the embodiment, for example, if the concentration level of the driver is estimated to drop to a value equal to or less than a predetermined threshold, the informing unit 40 configured to output audio information may inform the driver and/or other users, through the use of a predetermined sound or voice, that the concentration level of the driver has dropped. In the embodiment, for example, if the concentration level of the driver is estimated to drop to a value equal to or less than a predetermined threshold, the informing unit 40 configured to output tactile information may inform the driver and/or other users, through the use of a predetermined vibration, that the concentration level of the driver has dropped. The driver and/or other users can thus notice that the concentration level of the driver has dropped.

The following gives a description of how the electronic device 1 estimates internal information of the subject in the embodiment.

In the embodiment, the electronic device 1 performs, by using an autoencoder, machine learning based on a driver's image captured during driving, and estimates a driver's internal state, such as a concentration level. The autoencoder is an architecture of a neural network. The autoencoder is a neural network including an encoder (which may hereinafter be associated with symbol ENN) and a decoder (which may hereinafter be associated with symbol DNN). In the electronic device 1 according to the embodiment, the controller 10 may include capabilities of the autoencoder. That is, in the embodiment, the controller 10 of the electronic device 1 includes capabilities of the encoder ENN and the decoder DNN.

Figure 2:
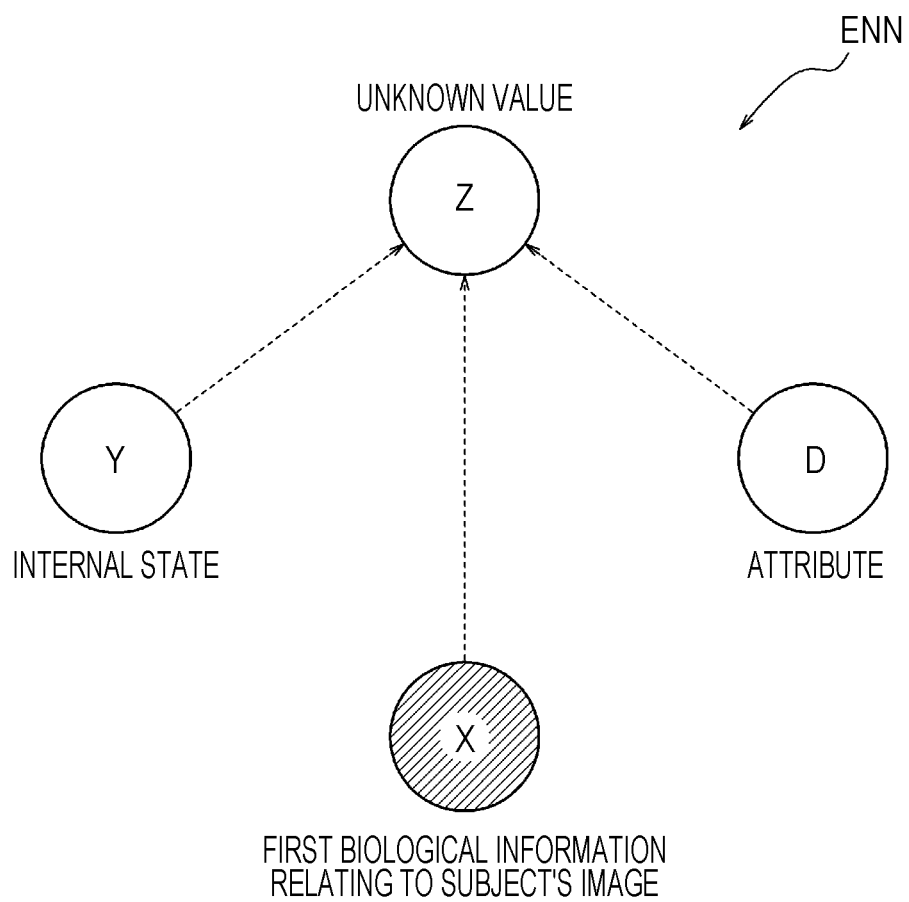
FIG. 2 is a conceptual diagram illustrating an example of encoding performed by the electronic device according to the first embodiment.
Figure 3:
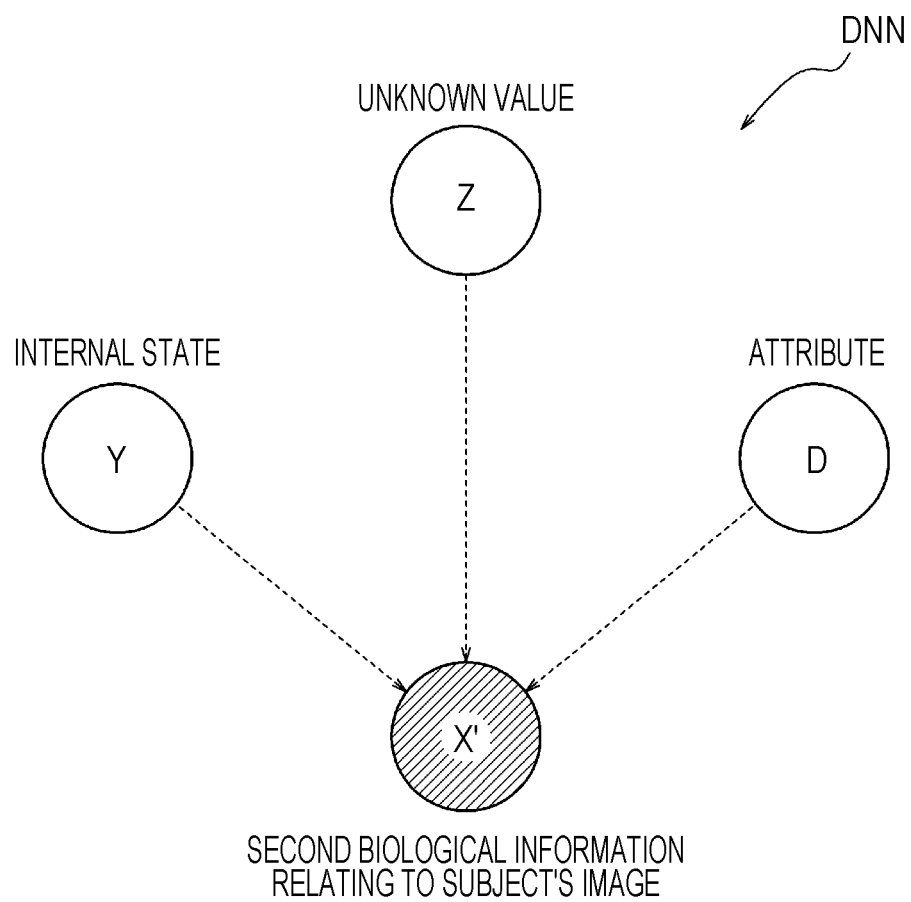
FIG. 3 is a conceptual diagram illustrating an example of decoding performed by the electronic device according to the first embodiment.

FIG. 2 and FIG. 3 are diagrams each conceptually illustrating a neural network that serves as an autoencoder in the electronic device 1 according to the embodiment. FIG. 2 is a diagram conceptually illustrating an encoder. That is, FIG. 2 is a diagram conceptually illustrating the encoder ENN of a neural network that serves as an autoencoder in the electronic device 1 according to the embodiment. FIG. 3 is a diagram conceptually illustrating a decoder. First, the following describes a principle under which, in the embodiment, the electronic device 1 estimates an internal state, such as a concentration level, of a subject, on the basis of a subject's (driver's) image. That is, FIG. 3 is a diagram conceptually illustrating the decoder DNN of a neural network that serves as an autoencoder in the electronic device 1 according to the embodiment.

To estimate a subject's internal state in the embodiment, the electronic device 1 assumes a generation process, as illustrated in FIG. 3, in which internal state information Y representing an internal state, an unknown value Z, and attribute information D serve as causal factors that generate second biological information X' relating to a subject's image. Here, the second biological information X' relating to the subject's image may be information including a subject's (e.g., driver's) line-of-sight image. The internal state information Y may include information representing an internal state, such as a concentration level, of the subject. The unknown value Z may include an unobservable latent variable. The attribute information D may include information representing attributes, such as age and/or sex, of the subject.

In machine learning in the electronic device 1 according to the embodiment, as illustrated in FIG. 2, the encoder ENN of the neural network first infers the unknown value Z from first biological information X relating to the subject's image, the internal state information Y, and the attribute information D. Here, the first biological information X relating to the subject's image may be information including a subject's (e.g., driver's) line-of-sight image. The subject's line-of-sight image included in the first biological information X may be extracted, by the extractor 12, from the subject's image captured by the imager 20. The internal state information Y may include, as described above, information representing an internal state, such as a concentration level, of the subject. The attribute information D may include, as described above, information representing attributes, such as age and/or sex, of the subject. The unknown value Z may include, as described above, an unobservable latent variable. Hereinafter, a phase for carrying out learning to estimate the subject's internal state may be simply referred to as "learning phase".

When the unknown value Z is inferred as described above, the decoder DNN of the neural network illustrated in FIG. 3 can generate the second biological information X' relating to the subject's image, from the inferred unknown value Z, the internal state information Y, and the attribute information D. The second biological information X' relating to the subject's image is a reconstruction of the first biological information X relating to the subject's image. In the electronic device 1 according to the embodiment, the degree to which the second biological information X' has changed from the original first biological information X may be used as a loss function, and weighing parameters of the neural network may be updated by error back propagation. The loss function may include a regularization term representing the degree to which the probability distribution followed by the unknown value Z deviates from a predetermined probability distribution. The predetermined probability distribution may be a normal distribution. The Kullback-Leibler divergence may be used as a term that represents the degree to which the distribution followed by the unknown value Z deviates from the predetermined probability distribution.

Figure 4:
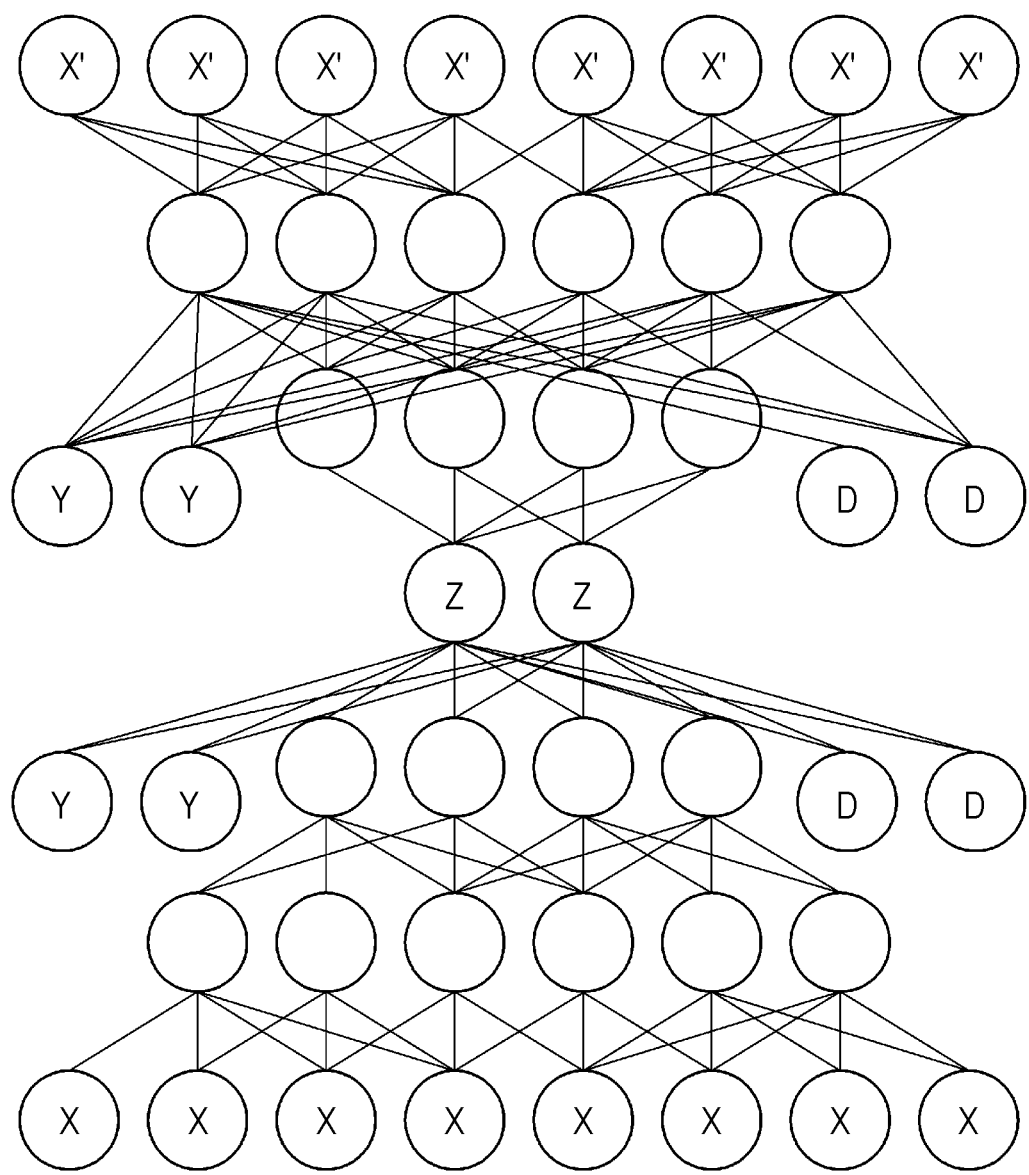
FIG. 4 is a conceptual diagram illustrating an operation of an autoencoder in the electronic device according to the first embodiment.

FIG. 4 is a diagram conceptually illustrating implementation of an autoencoder in the electronic device 1 according to the embodiment. The following first describes a learning phase performed by the electronic device 1 according to the embodiment.

As illustrated in FIG. 4, when the first biological information X in the bottom row is given and the internal state information Y and the attribute information D are further given, the unknown value Z in the middle row of FIG. 4 is inferred in the electronic device 1 according to the embodiment. Then, when the unknown value Z is inferred and the internal state information Y and the attribute information D are given, the second biological information X' in the top row is obtained in the electronic device 1 according to the embodiment.

In the electronic device 1 according to the embodiment, the internal state information Y and the unknown value Z may be estimated by receiving only the first biological information X and the attribute information D. The attribute information D including information representing attributes, such as age and/or sex, of the subject may be stored in the storage 30 in advance, received from the input unit, or received from the communication unit. The controller 10 may estimate the attribute information D from a subject's image captured by the imager 20.

As illustrated in FIG. 4, in the electronic device 1 according to the embodiment, the autoencoder reproduces the second biological information X' relating to the subject's image, from the first biological information X relating to the subject's image, the internal state information Y, and the attribute information D, via the unknown value Z. That is, in the electronic device 1 according to the embodiment, the autoencoder has the function of reconstructing at least one of a subject's line-of-sight image or line-of-sight feature (second biological information X') on the basis of at least one of the subject's line-of-sight image or line-of-sight feature (first biological information X). In the present disclosure, at least one of the subject's line-of-sight image or line-of-sight feature may include coordinate values (x, y) of a point of gaze. Also, in the present disclosure, the subject's line-of-sight image and line-of-sight feature may include not only the coordinates of the point of gaze, but also a line-of-sight feature, such as a pupil diameter or eye rotation information, or a combination of those. In the present disclosure, extracting at least one of the subject's line-of-sight image or line-of-sight feature may be simply referred to as "extracting the line of sight" or "acquiring the line of sight". In the present disclosure, estimating at least one of the subject's line-of-sight image or line-of-sight feature may be simply referred to as "estimating the line of sight" or "calculating the line of sight". Also, in the present disclosure, at least one of the subject's line-of-sight image or line-of-sight feature may include an image including an eyeball region. In the following description, information fed to the neural network may be defined as line-of-sight information having an image including the eyeball region, as it is biological information obtained after processing an image.

To estimate the internal state information Y in the electronic device 1 according to the embodiment, the subject's line-of-sight image or line-of-sight feature (second biological information X') may be reconstructed for various cases of the internal state, such as a concentration level. For example, a state where the subject is fully concentrating only on driving the movable body may be artificially created, and the subject's line-of-sight image or line-of-sight feature (second biological information X') corresponding to the internal state information Y representing the internal state in the created state may be reconstructed by the autoencoder of the electronic device 1 according to the embodiment. Also, for example, a state where the subject is not fully concentrating on driving the movable body may be artificially created, and the subject's line-of-sight image or line-of-sight feature (second biological information X') corresponding to the internal state information Y representing the internal state in the created state may be reconstructed by the autoencoder of the electronic device 1 according to the embodiment. Here, the state where the subject is not fully concentrating on driving the movable body may be a state where the driver is distracted by tasks other than driving. For example, the driver may be performing a predetermined mental calculation as a task other than driving while driving the movable body. Then, in accordance with the level of difficulty of the predetermined mental calculation (e.g., relatively simple mental calculation or relatively complex mental calculation), the level of the state where the subject is not fully concentrating on driving the movable body may be adjusted stepwise. For example, if the driver is performing a very simple mental calculation while driving the movable body, the subject may be regarded as being relatively concentrated while not fully concentrating on driving the movable body. If the driver is performing a very complex mental calculation while driving the movable body, the subject may be regarded as being relatively distracted from driving the movable body.

As described above, in the electronic device 1 according to the embodiment, the subject's line-of-sight image or line-of-sight feature (second biological information X') may be reconstructed for various cases of the internal state information Y. For example, the internal state information Y may be zero (Y=0) in a concentrated state and one (Y=1) in a distracted state. Then, the validity of the internal state information Y may be determined in accordance with the degree to which the subject's line-of-sight image (second biological information X') reconstructed on the basis of the internal state information Y representing various internal states reproduces the original subject's line-of-sight image (first biological information X). For example, if the degree to which the subject's line-of-sight image (second biological information X') reconstructed on the basis of internal state information Y1 reproduces the original subject's line-of-sight image or line-of-sight feature (first biological information X) is high, the internal state information Y1 can be determined to have high validity (i.e., close to the correct answer). On the other hand, if the degree to which the subject's line-of-sight image or line-of-sight feature (second biological information X') reconstructed on the basis of internal state information Y2 reproduces the original subject's line-of-sight image or line-of-sight feature (first biological information X) is low, the internal state information Y2 can be determined to have low validity (i.e., far from the correct answer). In the embodiment, the electronic device 1 may thus adjust the parameters of the encoder ENN and the decoder DNN on the basis of reproducibility of the first biological information X from the second biological information X'. The electronic device 1 may adjust the parameters of the encoder ENN and the decoder DNN on the basis of a loss function including not only the reproducibility, but also the degree of distribution deviation representing the degree to which the probability distribution followed by the unknown value Z estimated by the encoder ENN deviates from a predetermined probability distribution. In this case, the predetermined probability distribution may be a normal distribution. The degree of distribution deviation may be represented by the Kullback-Leibler divergence.

Figure 5:
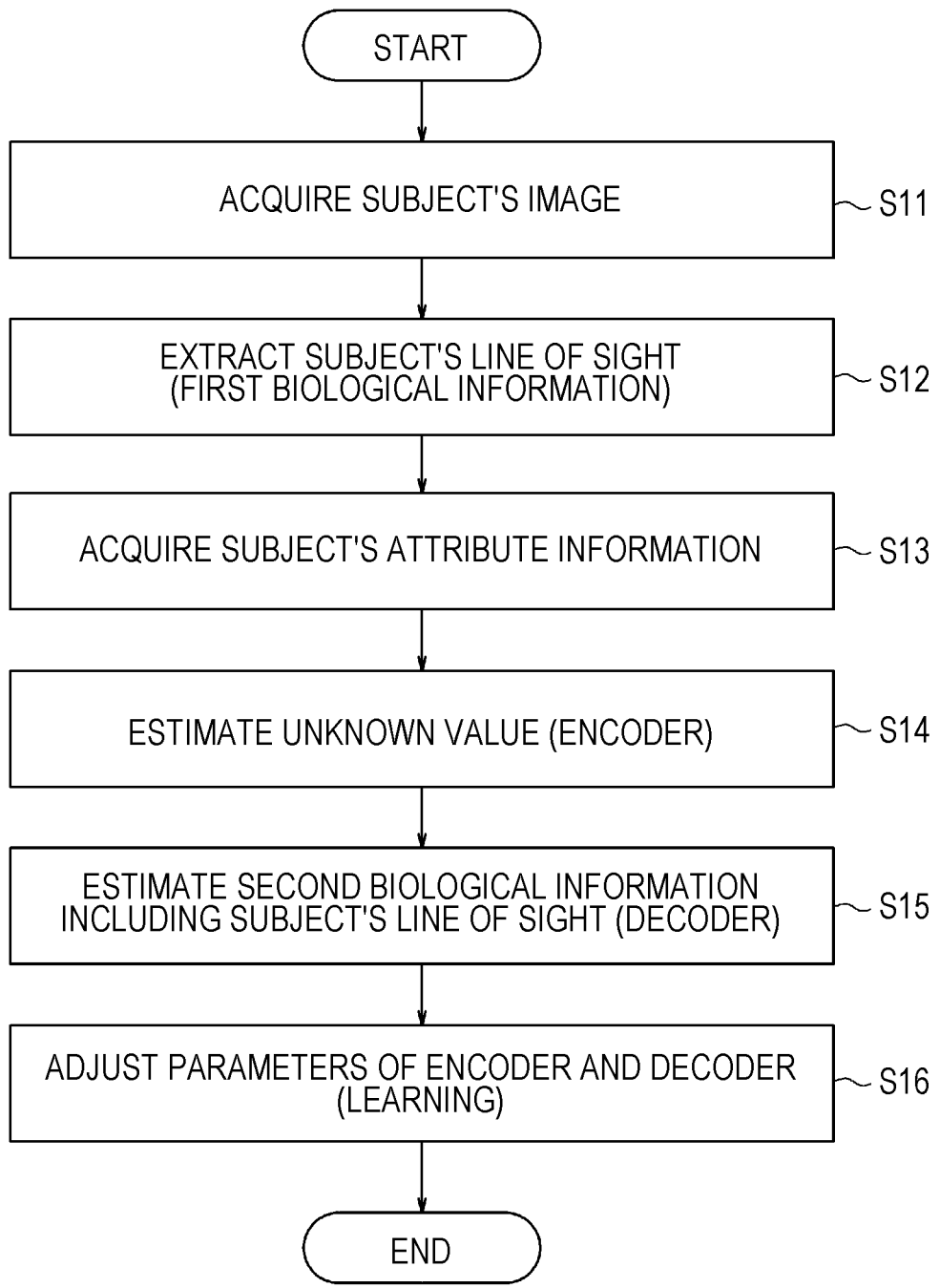
FIG. 5 is a flowchart illustrating an operation performed in a learning phase by the electronic device according to the first embodiment.

FIG. 5 is a flowchart illustrating a learning phase performed by the electronic device 1 according to the embodiment. With reference to FIG. 5, the following describes a learning phase performed by the electronic device 1 according to the embodiment.

At the start of operation of the learning phase illustrated in FIG. 5, a subject (driver) is driving a movable body. The subject may be actually driving a movable body, such as a passenger car, or may be virtually driving a movable body by using, for example, a driving simulator. Also, at the start of the operation illustrated in FIG. 5, the imager 20 is capturing a subject's image. For extracting at least one of a subject's line-of-sight image or line-of-sight feature from the subject's image, the imager 20 may capture an image including a subject's line of sight.

Also, at the start of the operation illustrated in FIG. 5, the storage 30 stores subject's predetermined attribute information. Here, the subject's predetermined attribute information may include at least one selected from the group consisting of subject's sex, age, and age category (e.g., 20s, 30s, or 40s), or may be other attribute information, such as a driver's driving record. The subject's predetermined attribute information may be stored in the storage 30 in advance, entered from the input unit by the subject when prompted as necessary, or received from the communication unit as necessary.

Upon starting the operation illustrated in FIG. 5, in the embodiment, the controller 10 of the electronic device 1 acquires a subject's image captured by the imager 20 (step S11). For extracting at least one of the subject's line-of-sight image or line-of-sight feature, as described above, the subject's image acquired in step S11 may be an image including a subject's line of sight.

After the subject's image is acquired in step S11, the extractor 12 of the controller 10 extracts at least one of the line-of-sight image or line-of-sight feature, such as the coordinates of the point of gaze of the subject, from the subject's image (step S12). Any technique, such as image recognition, may be used to extract the subject's line of sight from the subject's image in step S12. In the embodiment, the controller 10 of the electronic device 1 thus acquires the first biological information X including the subject's line of sight extracted from the subject's image in step S12.

After the subject's line of sight is extracted in step S12, the controller 10 acquires subject's predetermined attribute information (step S13). In step S13, the controller 10 may acquire the subject's predetermined attribute information, for example, from the storage 30. As described above, the subject's predetermined attribute information may include at least one selected from the group consisting of subject's sex, age, age category (e.g., 20s, 30s, or 40s), and driving record. In the embodiment, the controller 10 of the electronic device 1 thus acquires the subject's attribute information D in step S13. In the present disclosure, the driving record may include at least one selected from the group consisting of driving period, record of car accidents, date of acquisition of driver's license, driver's license holding period, record of driving lessons, and drivable vehicle information.

After the subject's attribute information is acquired in step S13, the estimator 14 of the controller 10 estimates an unknown value (step S14). In step S14, the estimator 14 may estimate the unknown value Z using the encoder ENN of the autoencoder, on the basis of the first biological information X including the subject's line of sight, the subject's attribute information D, and the subject's internal state information Y (see FIG. 2). Here, the subject's internal state information Y may be a value corresponding to a subject's concentration level externally created as described above.

After the unknown value is estimated in step S14, the estimator 14 of the controller 10 estimates the second biological information including the subject's line of sight (step S15). In step S14, the estimator 14 may estimate, using the decoder DNN of the autoencoder, the second biological information X' including the subject's line of sight, on the basis of the subject's internal state information Y, the unknown value Z, and the subject's attribute information D (see FIG. 3).

After the second biological information X' is estimated in step S15, the controller 10 adjusts parameters of the encoder ENN and the decoder DNN (step S16). In step S16, the controller 10 may adjust the parameters of the encoder ENN and the decoder DNN on the basis of the degree to which the first biological information X including the subject's line of sight is reproduced from the second biological information X' including the subject's line of sight. Also, as described above, the controller 10 may adjust the parameters of the encoder ENN and the decoder DNN on the basis of a loss function including not only this degree of reproduction, but also the degree of distribution deviation representing the degree to which the probability distribution followed by the unknown value Z inferred by the encoder ENN deviates from a predetermined probability distribution. In the embodiment, the electronic device 1 can perform learning in accordance with the operation in the learning phase described above.

As described above, in the electronic device 1 according to the embodiment, the encoder ENN of the controller 10 estimates the unknown value Z on the basis of the first biological information X including the subject's line of sight extracted from the subject's image, the subject's attribute information D, and the subject's internal state information Y. Also, in the electronic device 1 according to the embodiment, the decoder DNN of the controller 10 estimates the second biological information X' including the subject's line of sight, on the basis of the unknown value Z, the subject's attribute information D, and the subject's internal state information Y. Then, in the embodiment, the electronic device 1 adjusts the parameters of the encoder ENN and the decoder DNN on the basis of at least one of the reproducibility of the first biological information X from the second biological information X' or the degree of distribution deviation of the reproducibility and the unknown value Z.

In the embodiment, the subject's internal state information Y may include information representing the subject's concentration level. In the embodiment, the subject's internal state information Y may include information representing the subject's concentration level, particularly during driving of the vehicle.

In the embodiment, the subject's attribute information D may include a subject's sex. Also, in the embodiment, the subject's attribute information D may include a subject's age or age category. Also, in the embodiment, the subject's attribute information D may include a subject's driving record.

In the embodiment, the subject's attribute, such as at least one selected from the group consisting of subject's sex, subject's age, subject's age category, and subject's driving record, may be estimated from the subject's image. For example, in the electronic device 1 according to the embodiment, the controller 10 (or estimator 14) may estimate the subject's attribute, such as at least one selected from the group consisting of subject's sex, subject's age, subject's age category, and subject's driving record, from the subject's image captured by the imager 20. The subject's attribute may be estimated from the subject's image by any technique, such as image recognition. The subject's attribute may be estimated from the subject's image with higher accuracy by machine learning. That is, in the embodiment, the subject's attribute information D may be estimated on the basis of the subject's image. Only part of the image from which the attribute information is to be estimated may be subjected to machine learning in advance. In this case, the learning may be performed using data different from learning data used in estimating the internal state.

In the embodiment, the electronic device 1 can estimate the subject's internal state by performing a learning phase. Hereinafter, a phase for estimating the subject's internal state may be simply referred to as "estimation phase".

Figure 6:
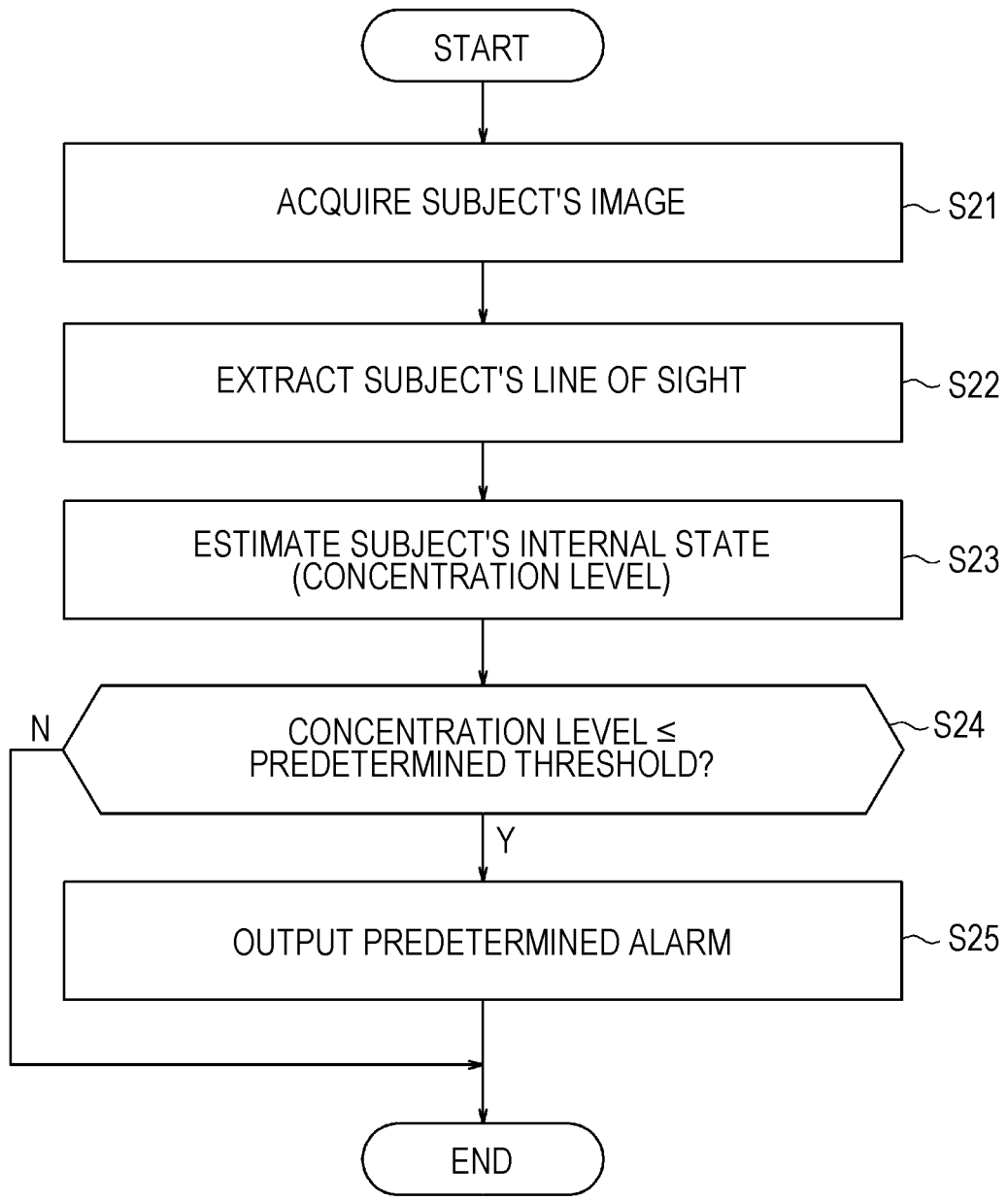
FIG. 6 is a flowchart illustrating an operation performed in an estimation phase by the electronic device according to the first embodiment.

FIG. 6 is a flowchart illustrating an estimation phase performed by the electronic device 1 according to the embodiment. With reference to FIG. 6, the following describes an estimation phase performed by the electronic device 1 according to the embodiment.

At the start of operation of the estimation phase illustrated in FIG. 6, a subject (driver) is driving a movable body. Here, the subject is actually driving the movable body, such as a passenger car. In a test, such as a verification experiment, the subject may be virtually driving the movable body by using, for example, a driving simulator. Also, at the start of the operation illustrated in FIG. 6, the imager 20 is capturing a subject's image. For extracting a subject's line of sight from the subject's image, the imager 20 may capture an image including a subject's line of sight.

Also, at the start of the operation illustrated in FIG. 6, the storage 30 stores subject's predetermined attribute information. Here, the subject's predetermined attribute information may include at least one selected from the group consisting of subject's sex, age, age category (e.g., 20s, 30s, or 40s), and driving record. The subject's predetermined attribute information may be stored in the storage 30 in advance, entered from the input unit by the subject when prompted as necessary, or received from the communication unit as necessary.

Upon starting the operation illustrated in FIG. 6, in the embodiment, the controller 10 of the electronic device 1 acquires a subject's image captured by the imager 20 (step S21). For extracting a subject's line of sight, as described above, the subject's image acquired in step S21 may be an image including a subject's line of sight. The operation of step S21 may be performed in a manner same as, or similar to, the operation of step S11 illustrated in FIG. 5.

After the subject's image is acquired in step S21, the extractor 12 of the controller 10 extracts at least one of the subject's line of sight or line-of-sight feature from the subject's image (step S22). The operation of step S22 may be performed in a manner same as, or similar to, the operation of step S12 illustrated in FIG. 5. In the embodiment, the controller 10 of the electronic device 1 thus acquires the first biological information X including the subject's line of sight extracted from the subject's image in step S22.

After the subject's line of sight is extracted in step S22, the estimator 14 of the controller 10 estimates the subject's internal state information Y (step S23). The subject's internal state information Y estimated in step S23 may be, for example, information representing a subject's concentration level. In the embodiment, the subject's internal state information Y may include information representing a subject's concentration level, particularly during driving of a vehicle (movable body), such as a passenger car.

In step S23, in the embodiment, the electronic device 1 may estimate the subject's internal state information Y in the following manner. That is, in the embodiment, the controller 10 of the electronic device 1 assumes, for example, that the internal state information Y in a concentrated state is 0 and that the internal state information Y in a distracted state is 1. The controller 10 thus assumes a plurality of pieces of internal state information Y. Also, in the embodiment, the controller 10 may assume a plurality of pieces of internal state information Y to be values ranging from 0 to 1.

Then, for each of the plurality of pieces of internal state information Y assumed as described above, the controller 10 examines the degree to which at least one of the reconstructed subject's line of sight or line-of-sight feature (second biological information X') reproduces the original subject's line-of-sight image (first biological information X). The estimator 14 then estimates the internal state information Y corresponding to the highest degree to which at least one of the reconstructed subject's line of sight or line-of-sight feature (second biological information X') reproduces at least one of the original subject's line of sight or line-of-sight feature (first biological information X) (or the highest reproducibility of the first biological information X from the second biological information X'), to be the current internal state (concentration level) of the subject. For example, if the reproducibility is highest when the subject's internal state information Y is 0, the estimator 14 may estimate that the subject is in a concentrated state. On the other hand, for example, if the reproducibility is highest when the subject's internal state information Y is 1, the estimator 14 may estimate that the subject is in a distracted state. Also, for example, if the reproducibility is highest when the subject's internal state information Y takes a value ranging from 0 to 1, the estimator 14 may estimate that the subject is at a concentration level corresponding to this value. The estimator 14 may estimate the subject's internal state by using a degree of distribution deviation representing the degree to which the probability distribution followed by the unknown value Z estimated by the encoder ENN deviates from a predetermined probability distribution. The predetermined probability distribution may be a normal distribution. The degree of field deviation may be represented by the Kullback-Leibler divergence.

After the subject's internal state information Y is estimated in step S23, the determiner 16 determines whether the estimated concentration level is equal to or less than a predetermined threshold (step S24). Before the operation of step S24, the predetermined threshold may be set as a criterion for determining whether to output an alarm related to the subject's concentration level. The predetermined threshold may be stored, for example, in the storage 30. In step S24, the determiner 16 may determine whether the estimated concentration level satisfies a predetermined condition, such as whether the estimated concentration level is equal to or less than the predetermined threshold.

If the concentration level is equal to or less than the predetermined threshold (or the concentration level has dropped) in step S24, the determiner 16 may output a predetermined alarm from the informing unit 40 (step S25) and end the operation illustrated in FIG. 6. On the other hand, if the concentration level is not equal to or less than the predetermined threshold (or the concentration level has not dropped) in step S24, the determiner 16 may end the operation illustrated in FIG. 6. After the end of the operation illustrated in FIG. 6, the controller 10 may appropriately restart the process illustrated in FIG. 6.

As described above, in the electronic device 1 according to the embodiment, the encoder ENN of the controller 10 estimates the unknown value Z on the basis of the first biological information X including the subject's line of sight extracted from the subject's image, the subject's attribute information D, and a value assumed to be the subject's internal state information Y. Also, in the electronic device 1 according to the embodiment, the decoder DNN of the controller 10 estimates the second biological information X' including the subject's line of sight, on the basis of the unknown value Z, the subject's attribute information D, and a value assumed to be the subject's internal state information Y. Then, in the embodiment, the electronic device 1 assumes a plurality of values to be the subject's internal state information Y, and estimates one of the plurality of values, corresponding to the highest reproducibility of the first biological information X from the second biological information X', to be the subject's internal state information Y. In the embodiment, the electronic device 1 may estimate the subject's internal state information Y by taking into consideration not only the reproducibility, but also the degree of distribution deviation representing the degree to which the probability distribution followed by the unknown value Z estimated by the encoder ENN deviates from a predetermined probability distribution. The predetermined probability distribution may be a normal distribution. The degree of field deviation may be represented by the Kullback-Leibler divergence.

In the embodiment, the electronic device 1 may output a predetermined alarm if one of the plurality of values assumed to be the subject's internal state information Y, corresponding to the highest reproducibility of the first biological information X from the second biological information X', satisfies a predetermined condition. The electronic device 1 may determine whether to output a predetermined alarm by taking into consideration not only the reproducibility, but also the degree of distribution deviation representing the degree to which the probability distribution followed by the unknown value Z estimated by the encoder ENN deviates from a predetermined probability distribution. The predetermined probability distribution may be a normal distribution. The degree of field deviation may be represented by the Kullback-Leibler divergence.

As described above, in the embodiment, the electronic device 1 can estimate the subject's internal state on the basis of the model where the subject's internal state serves as a causal factor that generates the biological information including the subject's line of sight. Therefore, in the embodiment, the electronic device 1 can reasonably estimate the internal state, such as a concentration level, of the subject, from a natural causal relation. Also, in the embodiment, the electronic device 1 can output a predetermined alarm if, for example, the subject's concentration level drops while the subject is driving the movable body. Thus, in the embodiment, for example, the electronic device 1 can improve safety of the subject who is driving the movable body.

Generally, the line of sight and/or attention behavior of human vary significantly among individuals. For example, the range of motion of the line of sight of the elderly is narrower than that of young people. To estimate the subject's internal state, therefore, a highly accurate result cannot be obtained without properly considering such individual differences. Also, when the subject's internal state is estimated, a model on which the result of estimation is based is preferably explained objectively to the user.

For example, to estimate the internal state, such as a concentration level, of the subject from a captured image of the subject, learning may be performed in a process opposite a causal relation between the internal state and the biological information. That is, as in known machine learning, learning may be performed to estimate the internal state from biological response data, such as the subject's line of sight. In this case, however, such a model structure with an opposite causal relation makes the internal data structure of the model a black box. As a result, since a causal factor cannot be identified, a wrong structure may be learned. Additionally, since the causal relation is a black box, it is difficult to objectively explain the model of the causal relation to the user.

In the electronic device 1 according to the embodiment, an algorithm that estimates a subject's internal state is based on a generative model different from a typical recognition model or regression model. A generative model in the electronic device 1 learns, from data, a process in which a subject's internal state and a subject's attribute (e.g., age, sex) serve as causal factors that generate a subject's line of sight. Therefore, in the embodiment, the electronic device 1 can be expected to improve estimation accuracy by taking the subject's individual attribute into consideration. Also, with the electronic device 1 according to the embodiment, a mechanism based on the data generation process can be objectively explained to the user. In the embodiment, the internal state, such as a concentration level, of the subject can be reasonably estimated on the basis of the data generation process.

Another embodiment will now be described.

Figure 7:
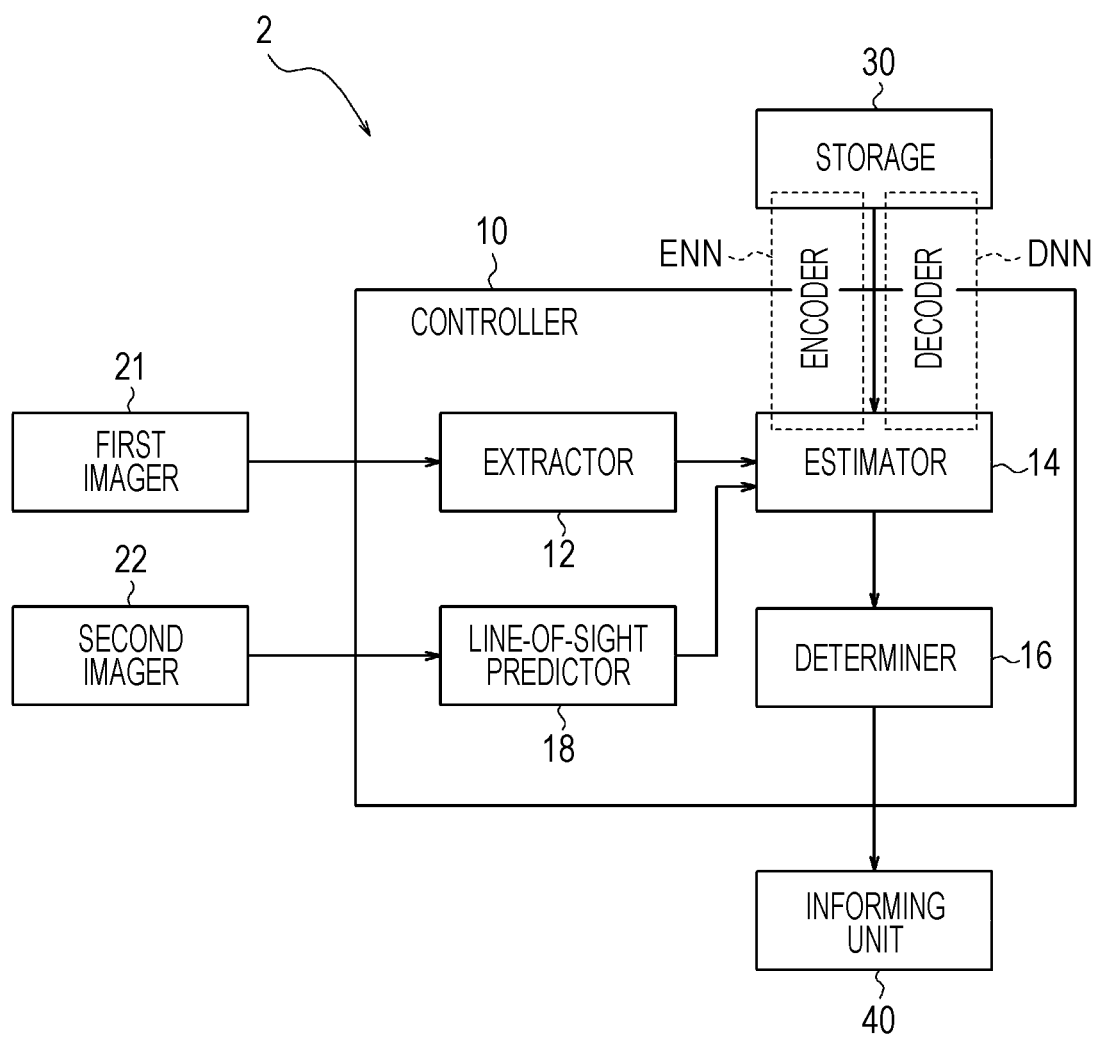
FIG. 7 is a block diagram illustrating a schematic configuration of an electronic device according to a second embodiment.

FIG. 7 is a block diagram illustrating a schematic functional configuration of an electronic device according to the embodiment.

As illustrated in FIG. 7, in the embodiment, an electronic device 2 includes a first imager 21 and a second imager 22, unlike the electronic device 1 illustrated in FIG. 1.

The first imager 21 illustrated in FIG. 7 may function in a manner same as, or similar to, the imager 20 illustrated in FIG. 1. That is, the first imager 21 illustrated in FIG. 7 may be configured to capture a subject's image. Therefore, like the imager 20 illustrated in FIG. 1, the first imager 21 illustrated in FIG. 7 may be installed toward the driver, in the forward part of the interior of the movable body, such as a passenger car.

The second imager 22 illustrated in FIG. 7 may be configured to capture an image of a scene that can be viewed by the subject. That is, the second imager 22 may be configured to capture an image (e.g., surrounding image) including a scene ahead of the subject's line of sight. Thus, unlike the first imager 21, the second imager 22 illustrated in FIG. 7 may be installed toward the front of the movable body, such as a passenger car, that is, installed in the same direction as the direction in which the driver's line of sight is directed.

As illustrated in FIG. 7, data of the image captured by the second imager 22 is fed to a line-of-sight predictor 18 of the controller 10. The line-of-sight predictor 18 predicts a subject's line of sight in an image of a scene that can be viewed by the subject. In the embodiment, the line-of-sight predictor 18 may estimate a map (line-of-sight prediction map) that predicts the subject's line of sight from an image (e.g., surrounding image) including a scene ahead of the subject's line of sight. Any existing technique may be adopted to generate the line-of-sight prediction map on the basis of an image of a scene that can be viewed by the subject.

As illustrated in FIG. 7, data of the line-of-sight prediction map estimated by the line-of-sight predictor 18 may be fed to the estimator 14. To estimate a subject's internal state, the estimator 14 may take into consideration not only the operation described above, but also data of the line-of-sight prediction map in a learning phase and/or estimation phase. Specifically, for example, the subject's attribute information D may include the data of the line-of-sight prediction map.

Thus, in the electronic device 2 according to the embodiment, the subject's attribute information D may include information that predicts the subject's line of sight. In this case, the information that predicts the subject's line of sight may be information predicted from a scene image in front of the subject.

The electronic device 2 illustrated in FIG. 7 not only serves as the electronic device 1 illustrated in FIG. 1, but can also estimate the subject's internal state on the basis of data of the subject's line-of-sight prediction map. Therefore, the electronic device 2 illustrated in FIG. 7 can be expected to achieve higher estimation accuracy than the electronic device 1 illustrated in FIG. 1 depending on the environment.

In FIG. 7, the second imager 22 is illustrated as a component separate from the first imager 21. However, from an image captured by one imager, such as a 360° dashboard camera, the first imager 21 and the second imager 22 may individually extract image data to be used.

A variation of the embodiment described above will now be described.

In the embodiment described above, the subject's internal state information Y has been described as one that includes information representing the concentration level of the subject (who is driving a movable body, such as a passenger car). In the electronic device according to the embodiment, the subject's internal state information Y estimated by the estimator 14 may include information representing a subject's emotion or mood. The information representing a subject's emotion or mood may be various types of information, such as information representing a subject's stress level, information representing a subject's emotion of irritation or anger, and information representing a subject's emotion of fatigue, anxiety, or worry.

When the subject's internal state information Y estimated includes information representing a subject's emotion or mood in the embodiment, for example, the electronic device can output an alarm appropriate for the subject's emotion or mood in response to a drop in subject's concentration level. For example, in the electronic device according to the embodiment, when the estimator 14 estimates a subject's internal state in step S23 of FIG. 6, the subject's internal state may include information representing a subject's emotion or mood. In the electronic device according to the embodiment, the controller 10 may output a predetermined alarm in accordance with a subject's emotion or mood in step S25 of FIG. 6. Specifically, in the embodiment, if a subject's emotion of irritation or anger is shown as the subject's concentration level drops, for example, the controller 10 of the electronic device may output a voice alarm in a tone or terms that can soothe the subject.

As described above, in the electronic device according to the embodiment, the subject's internal state information Y may include information representing the subject's emotion or mood. In the embodiment, in response to a drop in subject's concentration level, for example, the electronic device may output an alarm appropriate for the subject's emotion or mood as a predetermined alarm.

In the variation of the embodiment described above, the electronic device 1 can output an alarm appropriate for the subject's emotion or mood. Therefore, in the variation of the embodiment described above, for example, the electronic device 1 can be expected to further improve safety of the subject who is driving the movable body.

Any person skilled in the art can make variations of, and alterations to, the present disclosure. Accordingly, it is to be noted that such variations and alterations are within the scope of the present disclosure. For example, functional units, means, and steps in each embodiment may be added to other embodiments without logical inconsistency, or may be replaced with functional units, means, and steps in other embodiments. In each embodiment, a plurality of functional units, means, and steps may be combined into one, or may each be divided. Each embodiment of the present disclosure does not necessarily need to be implemented exactly as described above. The described features may be combined or partially omitted as appropriate.

REFERENCE SIGNS 1, 2 electronic device
10 controller
12 extractor
14 estimator
16 determiner
18 line-of-sight predictor
20 imager
21 first imager
22 second imager
30 storage
40 informing unit
ENN encoder
DNN decoder

The invention claimed is:

1. An electronic device comprising:
   an encoder configured to estimate an unknown value, based on first biological information including a line of sight of a subject extracted from an image of the subject, subject's attribute information representing an attribute of the subject, and a value assumed to be subject's internal state information representing an internal state of the subject;
   a decoder configured to estimate second biological information including the line of sight of the subject, based on the unknown value, the subject's attribute information, and the value assumed to be the subject's internal state information; and
   an estimator configured to assume a plurality of values to be the subject's internal state information, and estimate a value of the plurality of values to be the subject's internal state information, the value corresponding to the highest reproducibility of the first biological information from the second biological information.

2. The electronic device according to claim 1, wherein the electronic device outputs a predetermined alarm when a value of the plurality of values satisfies a predetermined condition, the value corresponding to the highest reproducibility of the first biological information from the second biological information.

3. The electronic device according to claim 1, wherein the subject's internal state information includes information representing a concentration level of the subject.

4. The electronic device according to claim 3, wherein the subject's internal state information includes information representing a concentration level of the subject during driving of a vehicle.

5. The electronic device according to claim 1, wherein the estimator performs estimation based on a degree of distribution deviation representing a degree to which a probability distribution followed by the unknown value estimated by the encoder deviates from a predetermined probability distribution.

6. The electronic device according to claim 1, wherein the subject's internal state information includes information representing an emotion or mood of the subject.

7. The electronic device according to claim 1, wherein
   the electronic device outputs a predetermined alarm when a value of the plurality of values satisfies a predetermined condition, the value corresponding to the highest reproducibility of the first biological information from the second biological information;
   the subject's internal state information includes information representing an emotion or mood of the subject; and
   an alarm appropriate for the subject's emotion or mood is output as the predetermined alarm.

8. The electronic device according to claim 1, wherein the subject's attribute information includes a sex of the subject.

9. The electronic device according to claim 1, wherein the subject's attribute information includes an age or age category of the subject.

10. The electronic device according to claim 1, wherein the subject's attribute information is estimated based on the image of the subject.

11. The electronic device according to claim 1, wherein the subject's attribute information includes information predicting the line of sight of the subject.

12. The electronic device according to claim 11, wherein the information predicting the line of sight of the subject is information predicted from a scene image in front of the subject.

13. A method for controlling an electronic device, the method comprising:
estimating an unknown value, based on first biological information including a line of sight of a subject extracted from an image of the subject, subject's attribute information representing an attribute of the subject, and a value assumed to be subject's internal state information representing an internal state of the subject;
estimating second biological information including the line of sight of the subject, based on the unknown value, the subject's attribute information, and the value assumed to be the subject's internal state information; and
assuming a plurality of values to be the subject's internal state information, and estimating a value of the plurality of values to be the subject's internal state information, the value corresponding to the highest reproducibility of the first biological information from the second biological information.

14. The method for controlling an electronic device according to claim 13, wherein the estimating the subject's internal state information is performed, based on a degree of distribution deviation representing a degree to which a probability distribution followed by the unknown value estimated in the estimating an unknown value deviates from a predetermined probability distribution.

15. A non-transitory computer-readable recording medium storing computer program instructions, which when executed by an electronic device, cause the electronic device to execute:
estimating an unknown value, based on first biological information including a line of sight of a subject extracted from an image of the subject, subject's attribute information representing an attribute of the subject, and a value assumed to be subject's internal state information representing an internal state of the subject;
estimating second biological information including the line of sight of the subject, based on the unknown value, the subject's attribute information, and the value assumed to be the subject's internal state information; and
assuming a plurality of values to be the subject's internal state information, and estimating a value of the plurality of values to be the subject's internal state information, the value corresponding to the highest reproducibility of the first biological information from the second biological information.

16. The program according to claim 15, wherein the estimating the subject's internal state information is performed, based on a degree of distribution deviation representing a degree to which a probability distribution followed by the unknown value estimated in the estimating an unknown value deviates from a predetermined probability distribution.

* * * * *